May 1, 1923.
A. O. SPENCER
BOLTLESS RAIL JOINT
Filed Dec. 12, 1922
1,453,957
2 Sheets-Sheet 2
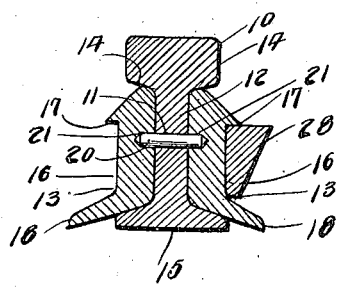
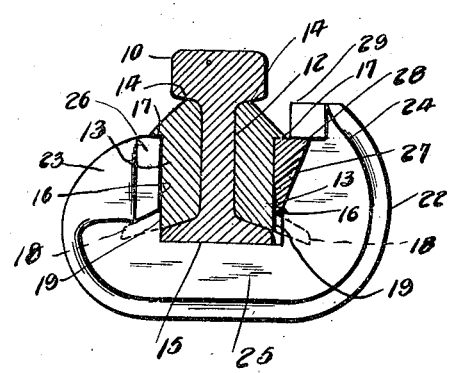
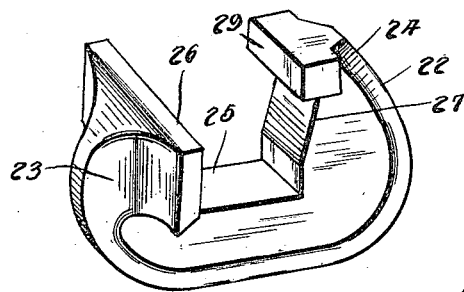
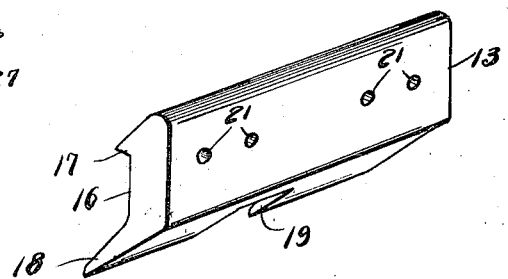
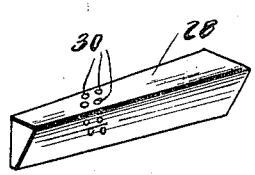
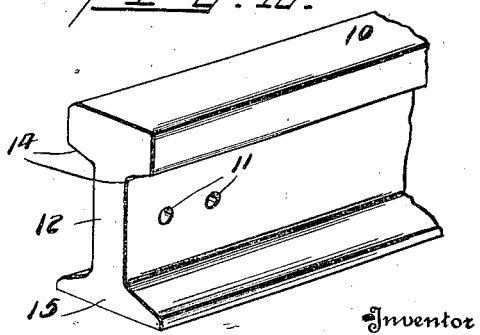
Inventor
A. O. Spencer.
By
Attorney Patented May 1, 1923.

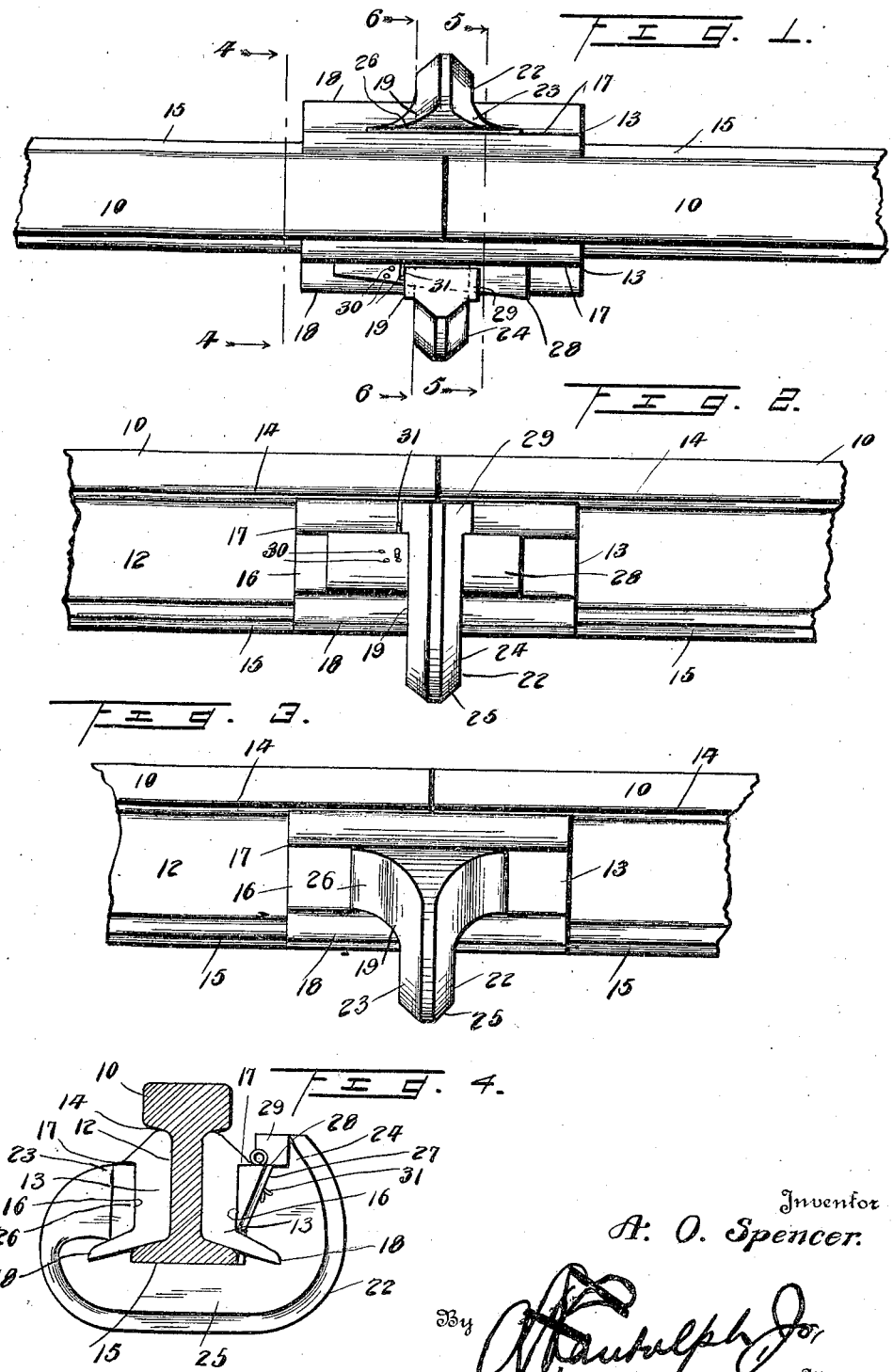

1,453,957

UNITED STATES PATENT OFFICE.

ANDY O. SPENCER, OF SHEFFIELD, ALABAMA.

BOLTLESS RAIL JOINT.

Application filed December 12, 1922. Serial No. 606,417.

*To all whom it may concern:*

Be it known that I, ANDY O. SPENCER, a citizen of the United States, residing at Sheffield, in the county of Colbert and State of Alabama, have invented certain new and useful Improvements in Boltless Rail Joints; and I do hereby declare the following to be a full, clear, and exact description of the invention, such as will enable others skilled in the art to which it appertains to make and use the same.

This invention relates to a rail joint.

It is primarily aimed to provide a joint which will avoid the use of bolts and which will be stronger than known constructions and will efficiently prevent creeping, low joints or sagging of the rail ends.

Another object is to provide a construction utilizing a novel clamp and locking means therefor which clamp is engageable with fish plates on opposite sides of the joint.

A further object is to provide a construction utilizing fish plates to span the junction line of the rails, pins to pass through the usual bolt holes of the rails and have the ends thereof anchored in holes or recesses of the fish plates, a clamp to embrace the fish plates and a wedge to coact with the clamp.

Various additional objects and advantages will become apparent from a consideration of the description following taken in connection with accompanying drawings illustrating one operative embodiment.

In said drawings:—

Figure 1 is a top plan view illustrating the application of a boltless rail joint constructed in accordance with my invention, Figure 2 is a view in side elevation of the boltless rail joint in applied position, the joint being viewed from the outer side thereof, Figure 3 is a similar view, looking in the direction of the inner side of the joint, Figure 4 is a vertical sectional view taken on the plane indicated by the line 4—4 of Figure 1, Figures 5 and 6 are similar views taken respectively on the planes indicated by the lines 5—5 and 6—6 of Figure 1, Figure 7 is a detail perspective view of the clamp, Figure 8 is a detail perspective view of the locking key, Figure 9 is a detail perspective view of one of the fish plates, and Figure 10 is a detail perspective view of a fragmentary portion of one of the rails.

To facilitate an understanding of the invention; adjacent ends of usual railway rails are shown at 10 having usual bolt holes 11 through the web 12 thereof.

In accordance with the invention, fish plates 13, similar in size and shape are disposed on opposite sides of and against the webs 12 and the under surfaces of the tread flanges 14 and the upper surfaces of the base flanges 15. Each fish plate has a groove 16 in its outer side wall whereby it is overlapped by a flange 17 at the top and by an outwardly and downwardly inclined flange 18 at the bottom. Each flange 18, substantially midway of its end is notched or recessed at 19, beyond the side edges of base flanges 15.

Pins 20 are adapted to be passed through the holes 11, instead of the usual bolts, since the fish plates here used are imperforate as shown. The pins 20 are adapted to project beyond opposite sides of the webs 12 and disposed in recesses 21 located in the fish plates, open at their inner surfaces, and alined with the holes 11.

A clamp for securing the fish plates and pins in place is shown at 22, being generally of U-shape having its legs differing in length or height, with its shorter leg designated 23 and its longer leg designated 24. The clamp 22 is adapted to embrace the joint with the bight or bridge 25 thereof extending across and below the joint with the legs extending upwardly through the notches 19 so that the rail ends will rest directly on the upper surface of bight 25. Leg 23 has an inward enlargement or projection 26 integral therewith which enters the groove 16 of one of the fish plates 13. Leg 24 is preferably triangularly notched as at 27 directly opposite the adjacent groove 16 so that a wedge key 28 may be inserted by slidable movement into the last mentioned groove 16 and the notch 27, and due to its wedge shape, preferably triangular in cross section as shown, drawing the clamp 22 tightly in place and the fish plates also tightly in place. It will be noted that a projection 29 is formed above the notch 27 to overlap the key 28. Key 28 also has a plurality of staggered openings or holes 30 therethrough so that a cotter key or other fastening pin 31 may be passed through one of them when the parts are in fastened position, to prevent accidental detachment of the wedge key. The plurality of holes compensate for slight variation in the sizes of the different parts and wear thereof, always insuring one of the holes 30 being in proper relation to the clamp for effective fastening of the cotter pin 31 thereto.

It will be realized of course that all of the parts are made of a suitable metal and may be readily applied or removed from the rails when desired. In the absence of the key 28, the clamp 22 is removable or applicable by movement axially about the rails. The positioning of the clamp will position the fish plates due to their interengagement at slots 19 so that all of the parts will thereafter be securely locked and clamped in place by application of the wedge key and cotter pin.

It will be particularly noted that both ends of the rails are seated on the bridge 25 and that relative longitudinal movement of the parts is prevented by the extension of the clamp into notches 19 and the engagement of the pins 20 with the rails and in the recesses 21.

As merely one operative embodiment has been illustrated and described, it is to be understood that changes in the details may be resorted to provided they fall within the spirit and scope of the invention.

I claim as my invention:—

1. A joint for rails consisting of fish plates to embrace the adjacent ends of the rails, said fish plates having grooves and flanges, said flanges adapted to extend outwardly beyond the base flanges of the rails and having notches therein, a substantially U-shaped clamp having upstanding legs one longer than the other, said legs adapted to be disposed in said notches, a projection on one of the legs entering the groove of the adjacent fish plate, the other leg having a notch and a projection overlapping the same, and a fastening key insertable through the last mentioned notch, and the groove of the other fish plate.

2. A joint for rails consisting of fish plates to embrace the adjacent ends of the rails, said fish plates having grooves and flanges, said flanges adapted to extend outwardly beyond the base flanges of the rail and having notches therein, a substantially U-shaped clamp having upstanding legs one longer than the other, said legs adapted to be disposed in said notches, a projection on one of the legs entering the groove of the adjacent fish plate, the other leg having a notch and a projection overlapping the same, a fastening key insertable through the last mentioned notch and the groove of the other fish plate, said fastening key having a plurality of holes, a fastening member to selectively pass through said notches to secure the fastening key against accidental displacement, and pins adapted to extend through the webs of the rails and into the fish plates.

In testimony whereof I affix my signature in presence of two witnesses.

ANDY O. SPENCER.

Witnesses:
A. L. HUNNIGAN,
W. A. VOITE.